April 13, 1965   H. P. BISHOP   3,178,152
VALVE CONSTRUCTION
Filed Sept. 8, 1961
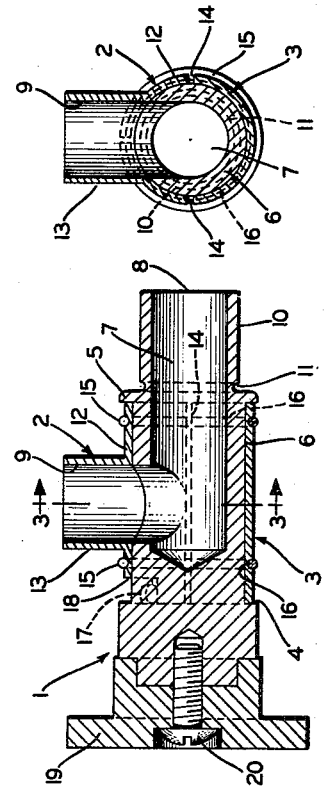
INVENTOR.
Harold P. Bishop
BY
Frease, Bishop, Johns & Schick
ATTORNEYS

United States Patent Office 3,178,152
Patented Apr. 13, 1965

3,178,152
VALVE CONSTRUCTION
Harold P. Bishop, 512 W. Gorgas St., Louisville, Ohio
Filed Sept. 8, 1961, Ser. No. 136,754
4 Claims. (Cl. 251—174)

The invention relates to valve casings and more particularly to a valve casing formed of two separable halves which are urged toward each other by spring means.

The invention is more particularly directed to valves of the general type in which a cylindrical valve member is rotatable within a casing and adapted to be rotated therein between open and closed positions.

In valves of this general type as now commonly in use certain disadvantages and difficulties have been experienced. For instance, dirt or other foreign matter may be carried into the valve and lodged between the casing and the rotary valve member therein causing interference with operation of the valve.

It has also been found that repeated rotation of the cylindrical valve member in use causes wear between the surfaces of the same and the casing.

It is a primary object of the invention to provide a valve construction which overcomes the above-mentioned disadvantages and difficulties.

Another object of the invention is to provide a valve comprising a rotatable, substantially cylindrical valve member, and a separable two-piece casing within which the same is rotatably mounted, the two paths of the valve casing being spring biased toward each other around the rotatable valve member.

The above and other objects, apparent from the drawings and following description, may be attained, the above described difficulties overcome and the advantages and results obtained, by the apparatus, construction, arrangement and combinations, subcombinations and parts which comprises the present invention, a preferred embodiment of which, illustrative of the best mode in which applicant has contemplated applying the principle, being set forth in detail in the following description and illustrated in the accompanying drawings. In general terms the invention may be briefly described as comprising a valve consisting of a valve casing formed of two separable, substantially semi-cylindrical, hollow members surrounding a substantially cylindrical valve member rotatably mounted therebetween, spring means urging the two halves of the valve casing toward each other around the rotatable valve member.

The separable halves of the casing being yieldably urged into contact with the surface of the rotatable valve member will prevent dirt or other foreign matter which may enter between the rotatable valve member and the casing from interfering with the operation of the valve. This construction will also compensate for wear between the surface of the rotatable valve member and the casing.

In a preferred embodiment of the invention one half of the valve casing is provided with a radially disposed tubular neck providing an inlet or outlet as may be desired, and the rotatable cylindrical valve member has an axial passage open through one end thereof providing an inlet or outlet as may be desired, said passage terminating radially through one side of the rotatable valve member and being adapted to be rotated into or out of register with the radial neck on the casing member. This, the rotatable valve member may be rotated to open or closed position.

Split spring rings are located in peripheral grooves in the two halves of the casing in order to yieldably urge the same into contact with the rotatable valve member. Means, such as a knob, is provided upon one end of the rotatable valve member for rotating the same, and means is provided upon the other end thereof for the swivel attachment of a hose, pipe or the like.

Having thus briefly described the invention, reference is now made to the embodiments thereof illustrated in the drawings, in which:

FIG. 1 is a side elevation of a preferred embodiment of the improved valve construction;

FIG. 2 is a longitudinal sectional view through the valve shown in FIG. 1, taken on the line 2—2, FIG. 1; and FIG. 3 is a transverse sectional view taken on the line 3—3, FIG. 2.

Referring now more particularly to the embodiments of the invention illustrated in the drawings, in which similar numerals refer to similar parts throughout, in the embodiment shown in FIGS. 1 to 3, the valve construction comprises generally the substantially cylindrical, rotatable valve member indicated generally at 1, and the separable casing members indicated generally at 2 and 3.

The rotatable valve member 1 has an annular shoulder 4 at one end and an annular shoulder 5 adjacent the other end, defining therebetween the cylindrical portion 6. An axial passage 7 is open through one end of the rotatable valve member 1, as indicated at 8, the other end of said passage extending radially through one side of the valve member 1, as indicated at 9.

Beyond the shoulder 5, the end of the rotatable valve member 1 may be reduced in diameter, as indicated at 10, and may be provided with a peripheral groove 11 for the swivel attachement of a hose or pipe, so that the valve member 1 may be rotated axially relative thereto.

The casing member 2 has a hollow, semi-cylindrical portion 12 and a radially disposed tubular neck 13 to which a hose or pipe may be connected. Thus, the end 8 of the passage 7 in the valve member 1 may provide an inlet and the tubular neck 13 an outlet or vice versa, as desired.

The casing member 3 is a hollow, semi-cylindrical form and the two casing members 2 and 3 are of such size and shape that when the cylindrical portion 6 of the rotatable valve member is received therebetween, opposed edge portions of the two casing members will be spaced slightly apart, as indicated at 14 in FIG. 3.

For the purpose of yieldably urging the casing members 2 and 3 toward each other around the cylindrical portion 6 of the rotatable valve member 1, split spring rings 15 are located in peripheral grooves 16 in the casing members 2 and 3.

For the purpose of limiting the rotating movement of the valve member 1, a stop pin 17 may be fixed to the periphery thereof and adapted to move within the limits of the notch 18 formed in one of the casing members 2 or 3, as desired.

A knob 19 may be fixed to, or formed integrally upon, one end of the valve member 1 for manually rotating the same. In the drawings this knob is shown as being attached to the adjacent end of the valve member 1 by a screw 20.

With the construction above described, the rotatable valve member 1 may be axially rotated to open or closed position, as desired, the casing members 2 and 3 being spring biased around the rotatable valve member so as to urge the two casing members into contact with the cylindrical portion 6 of the rotatable valve member.

It will be seen that since the two casing members are yieldably urged into contact with the rotatable valve member, this will compensate for any dirt or foreign matter which may enter the valve and become lodged between the rotatable valve member and the casing, thus preventing the same from interfering with free rotation of the valve member.

It will also be obvious that since the casing members are spring biased toward each other around the rotatable valve member, any wear between the valve member and casing members may be compensated for.

The improved valve construction is especially adapted for use on vacuum lines, as it will be seen that vacuum passing through the valve will tend to draw the two halves of the casing toward each other around the rotatable valve member.

From the above it will be obvious that a simple, inexpensive and easily assembled valve construction is provided, in which the spring-biased members of the valve casing are normally urged toward each other by spring or other resilient means to compensate for wear between the parts, while also providing sufficient relative movement of the casing members to prevent dirt or foreign matter which may enter the valve from interfering with proper operation thereof.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Valve construction comprising a rotatable valve member having annular shoulders adjacent opposite ends and a cylindrical portion therebetween, two separable valve casing members each having a hollow, semi-cylindrical portion within which the cylindrical portion of the valve member is journalled, said semi-cylindrical portion of the casing members each being of a length equal to the distance between said annular shoulders and having an outside diameter slightly less than said annular shoulders, a radially disposed tubular neck on one of said casing members, there being a passage extending axially through one end of said rotatable valve member and terminating at its other end in a radially disposed port for cooperation with said tubular neck, and split spring rings located around opposite end portions of the semi-cylindrical portions of said casing members for yieldably urging them toward each other around said rotatable valve member.

2. Valve construction comprising a rotatable valve member having annular shoulders adjacent opposite ends and a cylindrical portion therebetween, two separable valve casing members each having a hollow, semi-cylindrical portion within which the cylindrical portion of the valve member is journalled, said semi-cylindrical portion of the casing members each being of a length equal to the distance between said annular shoulders and having an outside diameter slightly less than said annular shoulders, a radially disposed tubular neck on one of said casing members, there being a passage extending axially through one end of said rotatable valve member and terminating at its other end in a radially disposed port for cooperation with said tubular neck, there being peripheral grooves in opposite end portions of the semi-cylindrical portions of said casing members, and split spring rings located in said grooves for yieldably urging said casing members toward each other around said rotatable valve member.

3. Valve construction comprising a rotatable valve member having annular shoulders adjacent opposite ends and a cylindrical portion therebetween, two separable valve casing members each having a hollow, semi-cylindrical portion within which the cylindrical portion of the valve member is journalled, said semi-cylindrical portion of the casing members each being of a length equal to the distance between said annular shoulders and having an outside diameter slightly less than said annular shoulders, a radially disposed tubular neck on one of said casing members, there being a passage extending axially through one end of said rotatable valve member and terminating at its other end in a radially disposed port for cooperation with said tubular neck, a knob of greater diameter than said rotatable valve member, means detachably connecting said knob to the other end of said rotatable valve member, and split spring rings located around opposite end portions of the semi-cylindrical portions of said casing members for yieldably urging them toward each other around said rotatable valve member.

4. Valve construction comprising a rotatable valve member having annular shoulders adjacent opposite ends and a cylindrical portion therebetween, two separable valve casing members each having a hollow, semi-cylindrical portion within which the cylindrical portion of the valve member is journalled, said semi-cylindrical portion of the casing members each being of a length equal to the distance between said annular shoulders and having an outside diameter slightly less than said annular shoulders, a radially disposed tubular neck on one of said casing members, there being a passage extending axially through one end of said rotatable valve member and terminating at its other end in a radially disposed port for cooperation with said tubular neck, a knob of greater diameter than said rotatable valve member, means detachably connecting said knob to the other end of said rotatable valve member, there being peripheral grooves in opposite end portions of the semi-cylindrical portions of said casing members, and split spring rings located in said grooves for yieldably urging said casing members toward each other around said rotatable valve member.

References Cited by the Examiner

UNITED STATES PATENTS

| 1,265,971 | 5/18 | Taber | 251—304 X |
| 1,519,670 | 12/24 | Danstrup | 251—180 X |
| 1,956,919 | 5/34 | Glomb | 251—310 X |
| 2,240,074 | 4/41 | Kain | 251—181 |
| 2,240,711 | 5/41 | Miller | 137—375 |
| 2,566,071 | 8/51 | Schobert | 251—182 |
| 2,907,587 | 10/59 | Harris | 251—310 X |

FOREIGN PATENTS

| 287,339 | 4/53 | Switzerland. |
| 391,253 | 2/24 | Germany. |
| 506,360 | 10/51 | Belgium. |
| 521,790 | 5/40 | Great Britain. |
| 867,610 | 5/61 | Great Britain. |
| 1,101,884 | 3/61 | Germany. |
| 1,137,070 | 1/57 | France. |

ISADOR WEIL, *Primary Examiner.*

M. CARY NELSON, CLARENCE R. GORDON,
*Examiners.*